Figure 1:
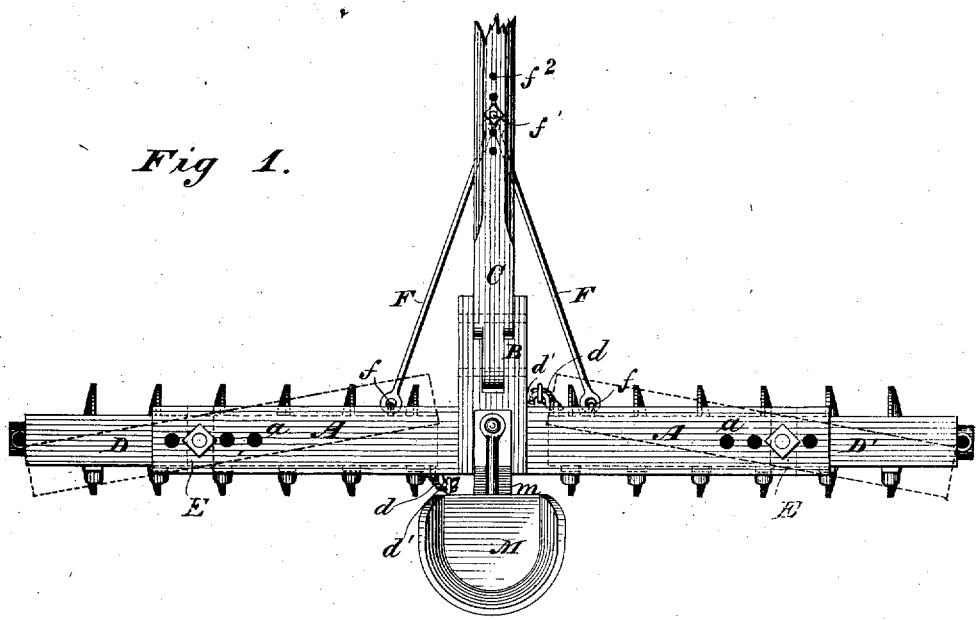

2 Sheets—Sheet 1.

E. BAYLISS.
Wheel Harrow.

No. 8,147. Reissued April 2, 1878.

WITNESSES

Wm A Skinkle

Geo. W. Breck.

INVENTOR

Edwin Bayliss

By his Attorneys

Baldwin Hopkins & Peyton

E. BAYLISS.
Wheel Harrow.

No. 8,147. Reissued April 2, 1878.

WITNESSES

Wm A Skinkle

Geo. W. Beck.

INVENTOR

Edwin Bayliss.

By his Attorneys

Baldwin Hopkins & Peyton

UNITED STATES PATENT OFFICE.

EDWIN BAYLISS, OF MASSILLON, OHIO.

IMPROVEMENT IN WHEEL-HARROWS.

Specification forming part of Letters Patent No. 146,224, dated January 6, 1874; Reissue No. 8,147, dated April 2, 1878; application filed March 18, 1874.

*To all whom it may concern:*

Be it known that I, EDWIN BAYLISS, of Massillon, in the county of Stark and State of Ohio, have invented certain new and useful Improvements in Wheel-Harrows and Cultivators, of which the following is a full, clear, and exact description.

My invention relates to that class of wheel-harrows having harrow, cultivator, or pulverizer disks arranged in gangs upon horizontal shafts.

The object of the first part of my invention is to adapt the gangs to follow or conform to uneven surfaces over which they pass, which end I attain by combining wheel or disk gangs with a transverse bar or main frame by means of interposed swiveling hinge-connections, which allow the gangs to play freely relatively to the frame.

The object of the next part of my invention is to adjust the wheel-gangs relatively to the line of draft without interfering with their vibrations on their hinge-connections, which end I attain by combining a main frame or main transverse bar, a tongue connected therewith, wheel or disk gangs united to the main frame by interposed swiveling hinge-connections, and an adjustable connection between the tongue and wheel or disk gangs, which latter connection allows their angle relatively to the line of draft to be varied without interfering with their vibrations on their hinge-connections.

The object of the next part of my invention is to limit the oscillation of the wheel gangs or disks on their hinge-connections, which end I attain by combining a main frame or main transverse bar, wheel or disk gangs connected therewith by interposed swiveling hinge-connections, and chains or stops, to limit the vibrations of the gangs relatively to the main frame.

My invention further consists in combining, in a wheel harrow, a main frame or main transverse bar, a tongue, a driver's seat, wheel or disk gangs connected with the main frame by interposed swiveling hinge-connections, and adjustable connections between the gangs and tongue, to adjust the angles of the disks relatively to the line of draft, and to limit their vibrations relatively to the main frame.

The next part of my invention relates to the method of mounting the harrow-disks upon their spindles, in order to insure a uniform rotation, which end I attain by combining harrow-disks having polygonal sockets (or an equivalent adjusting device) with interposed spacing-ferrules constructed with projections engaging said sockets, as hereinafter set forth.

The next part of my invention relates to mounting the disk-gangs in their bearings. Its objects are to prevent wear of the bearings or gang-spindles and insure their proper lubrication, which ends I attain by mounting the gang-spindles in hanger-bearings recessed to receive lubricating material and friction-washers, which take the end thrust occasioned by the inclination of the spindles to the line of draft.

Figure 2:
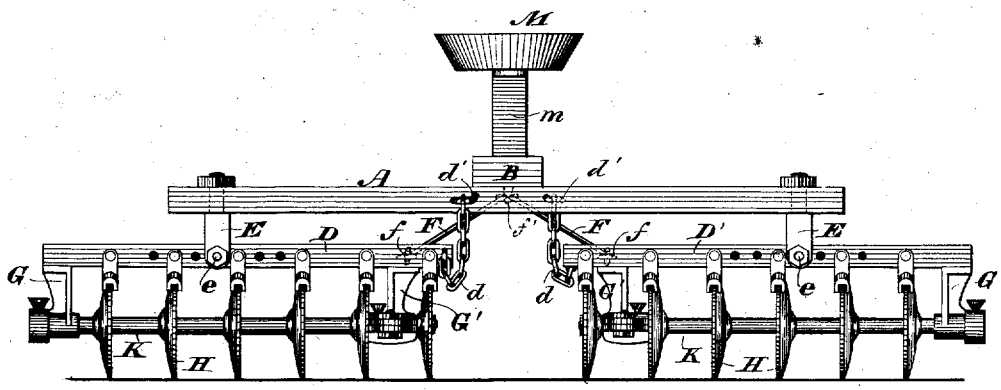
Figure 3:
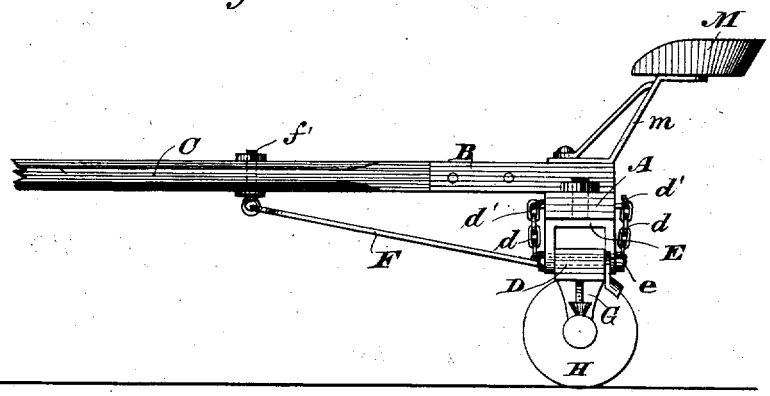
Figure 5:
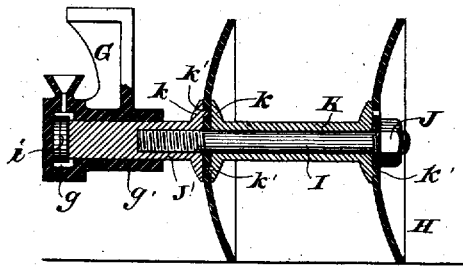
Figure 6:
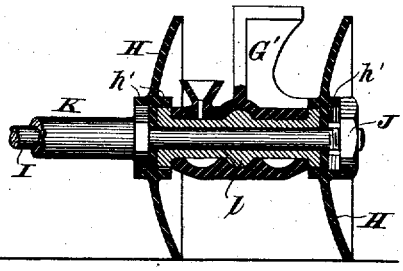
Figure 7:
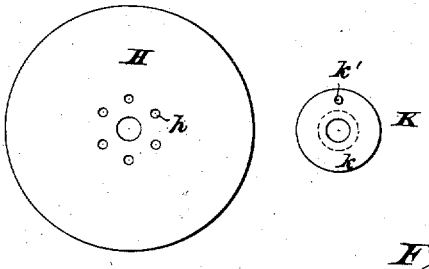
Figure 8:
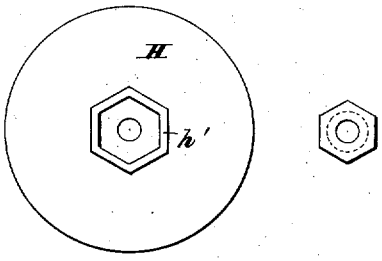
Figure 4:
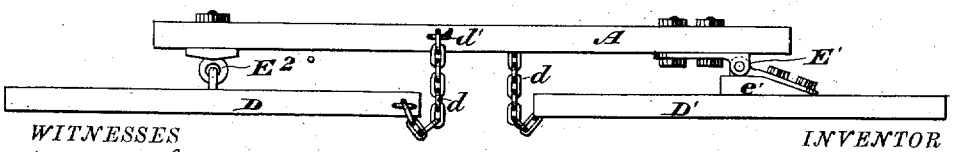

In the accompanying drawings, which represent all my improvements as embodied in one machine, Figure 1 represents a plan of my improved wheel-harrow; Fig. 2, a rear elevation thereof; Fig. 3, a side elevation; Fig. 4, a rear view of a transverse frame-bar and wheel gang-bars, showing modifications in the form of their hinge-connections; Fig. 5, a vertical central section through one of the outer or rear hangers or pendent bracket-bearings, the disks, their spindle, and spacing-ferrules; Fig. 6, a similar section through one of the inner or forward hangers or pendent bracket-bearings, its spindle, disks, &c. Figs. 7 and 8 show detail views of the disks and their locking devices.

In the accompanying drawings, A represents a main frame, or its main transverse bar, and B a longitudinal bar or bars, to which a pole or tongue, C, is pivoted. Instead of bolting the gang bars or frames D D′ directly to the under face of the main frame or main transverse bar A, or simply connecting them therewith by a vertical pivot, to permit their angular adjustment relative to the path of the machine, as heretofore has been usual in this class of machines, I combine them with said frame or bar by means of swiveling hinged connections, shown in the drawings as consisting of angle-irons or hinged plates E $E^1$ $E^2$, united with the frame-bar by a vertical pivot, which permits them to turn horizontally to vary the angle of the gang-bars relative to the path of the machine, as above explained, and I also connect said hinged plates to the gang-bars by means of a horizontal transverse bolt or pivot, *e*, on which the gang-bars rock vertically to conform to the uneven surface of the ground over which they pass.

Fig. 4 shows modifications of the hinge-connection above described. $E^1$ represents a strap-hinge, one leaf of which is pivoted or bolted to the main frame or bar A, and the other to a block, *e'*, on the gang-bar. The hinge $E^2$ is shown as formed of two eyebolts, one secured in the frame-bar and the other in the gang-bar, thus forming a double joint permitting of the swiveling movements above described.

The gang-bars are removed by their interposed hinged connections sufficiently far from the frame-bar to permit of their required vertical vibration relatively thereto. The hinge-connections may be adjusted transversely relatively to the machine by securing their pivot in any one of a series of holes, *a*, upon the frame-bar, and the gang-bars are likewise capable of a similar adjustment relatively to their hinges by means of a series of holes in them, in any one of which the pivot *e* may be inserted. By means of these adjustments the strain of the wheel-gangs on either side of their pivots or axis of oscillation may be adjusted, balanced, or varied.

The hinge or pivotal connections between the frame-bar and gang-bars are preferably located at a point nearer their outer than their inner ends, so as to throw the greater strain or drag upon the inner end of each gang. The tendency thus created for the inner ends to drag behind their outer ends is counteracted by means of an adjustable connection between the inner end of the wheel-gangs and the tongue, which connection is shown as consisting of a draft-rod, F, connected with each gang-bar, near its inner end, by an eyebolt, *f*, and by a similar connection between the forward end of the draft-rod and an eyebolt, $f^1$, capable of adjustment backward or forward in one of a series of holes, $f^2$, on the tongue, by which means the angle of the gangs relatively to the path of the machine may be adjusted as desired. Adjustable links or chains *d d*, attached at one end to the gang-bars and at the others to the frame-bar A or tongue C, serve to limit the downward movement of the inner ends of the gang-bars, the frame-bar itself acting as a stop to limit their upward movement.

The chains may be lengthened or shortened by hooking different links into hooks *d'*, to limit the flexibility of the disk-gangs to suit the ground over which they may be passing, and to prevent the gangs from turning too far on their horizontal pivots in turning corners, &c.

The ends of the spindles I upon which the disk-gangs revolve screw into journal-bearings or nuts J J', which are mounted in hangers G depending from the gang-bars D; and as the disks shown in the drawing are dished, with their concave sides turned toward the center of the machine, and as the inner end of each gang (in the construction shown) is arranged to travel somewhat in advance of its outer end, the disks revolve in lines oblique to the line of draft, and tend to gather and throw the soil inward. It consequently bears against the concave sides of the disks, pressing their spindles hard outward into recesses or boxes in the outside hangers G. This pressure, in the present form of construction, causes the hangers soon to wear through and need renewing.

My improved construction for obviating this objection is shown in Fig. 5, the box being formed with a recess, *g*, cored out at its closed end, of a diameter greater than that of its open end *g'*, in which latter the journal-bearings of the spindle fit loosely. The recess *g* serves the twofold purpose of holding oil for lubricating the end or journal-bearing of the spindle I, and for the reception of two or more solid leather disks or washers, *i*, made to fit loosely in the recess, but so large as to pass through the open end of the box only with considerable pressure. This insures their always remaining in place. These washers take the pressure off the spindle, and being constantly oiled, owing to the oil-receptacle, prevent the wear referred to above.

The inner pendants or down-hangers G' of each gang are constructed with a divided bearing, each half of which is cast with a central groove, and the lower half with a reservoir, the former for the reception of a collar on the inclosed thimble and the latter for the reception of oil to keep the journals lubricated.

The collar *l* serves to relieve the end thrust and to take the wear off the shaft, and, being thus inclosed, is protected from dirt and grit, to which the ordinary wearing-surfaces of this class of machines are exposed.

The harrow-disks H have a series of perforations, *h*, arranged in a circle around the spindle. The hubs *k* of the spacing-thimbles K are provided with spurs or teats *k'*, which enter into one of the series of perforations above mentioned in the disks, and the entire series of disks and thimbles, being clamped together by the usual nuts J J', insure uniform rotation of the disks.

Instead of being perforated, the disks may have upon each face polygonal sockets, consisting of a raised bead or flange, *h'*, (concentric with the spindle I,) large enough to receive the ends of hubs or ferrules made of corresponding form, (but somewhat less in diameter to allow for inaccuracies in casting,) but at the same time large enough to insure the rotation together of the disks and thimbles. The nut which secures the end or last ferrule in place should be enlarged sufficiently to rest on the face of the bead forming the socket.

By the employment of the series of perforations *h*, pins or polygonal sockets, and links, as above described, the disks may be adjusted relatively to each other and to the spacing-thimbles to compensate for variations in warping of parts in cooling, and also for inaccuracies in molding.

The outer ends of the frame-bars may be provided with boxes to receive weights for increasing the efficiency of the harrow, or for adapting it to the character of the ground on which it is used.

A driver's seat, M, is shown as mounted upon a standard, *m*, secured upon the tongue or its extension centrally over the frame-bar A.

When used as a cultivator, the disk-gangs may be separated either by moving transversely the hinge-connections in the main frame or in the gang-planks, or both, so as to straddle the row of corn or other crop to be cultivated; and, if necessary, shorter gangs can be used, consisting of a less number of disks, to suit the different widths between rows of different kinds of crops.

By supplying shorter gang-planks and rods for the lesser number of thimbles and disks, the manufacturer may, at this slight extra cost, furnish a combined pulverizer and cultivator, as disks, thimbles, nuts, hangers, &c., can be common to both.

A seeding attachment of any usual or preferred construction may be applied in the manner usual in this class of machines.

I claim as of my own invention—

1. The combination, substantially as hereinbefore set forth, of a main frame (or main transverse bar) and wheel or disk gangs connected therewith by interposed swiveling hinge-connections, which permit the gangs to vibrate freely relatively to the main frame to conform to uneven surfaces over which they pass.

2. The combination, substantially as hereinbefore set forth, of a main frame, (or main transverse bar,) a tongue connected therewith, wheel or disk gangs united with the main frame by interposed swiveling hinge-connections, and an adjustable connection between the tongue and wheel or disk gangs, whereby the angle of the gangs relatively to the line of draft may be varied without interfering with their vibrations on their hinge-connections.

3. The combination, substantially as hereinbefore set forth, of a main frame, (or main transverse bar,) wheel or disk gangs connected with the main frame by interposed swiveling hinge-connections, and chains or stops, for limiting the vibrations of the gangs relatively to the main frame.

4. The combination, substantially as hereinbefore set forth, of a main frame, (or main transverse bar,) a tongue connected therewith, a driver's seat, wheel or disk gangs connected with the main-frame by interposed swiveling hinge-connections, and adjustable connections between the gangs and tongue, to adjust the angles of the disks relatively to the line of draft, and to limit their vibrations relatively to the main frame.

5. Harrow-disks provided with polygonal sockets, or an equivalent adjusting device, in combination with the spacing-ferrule constructed with projections interlocking with the disk-sockets, substantially as shown, and for the purposes described.

6. The combination, substantially as hereinbefore set forth, of gang-bars, hangers having bearings enlarged at one end to constitute lubricating-chambers, friction-washers inclosed in said lubricating-chambers, and disk-gang spindles inclined to the line of draft, whereby wear of the spindles is prevented and lubrication insured.

EDWIN BAYLISS.

Witnesses:
S. B. RIGDON,
FELIX R. SHEPLEY.